Feb. 27, 1951 C. G. ECKERS 2,543,660
METHOD OF PRODUCING STARCH FROM STARCH MILK
Filed Oct. 15, 1947
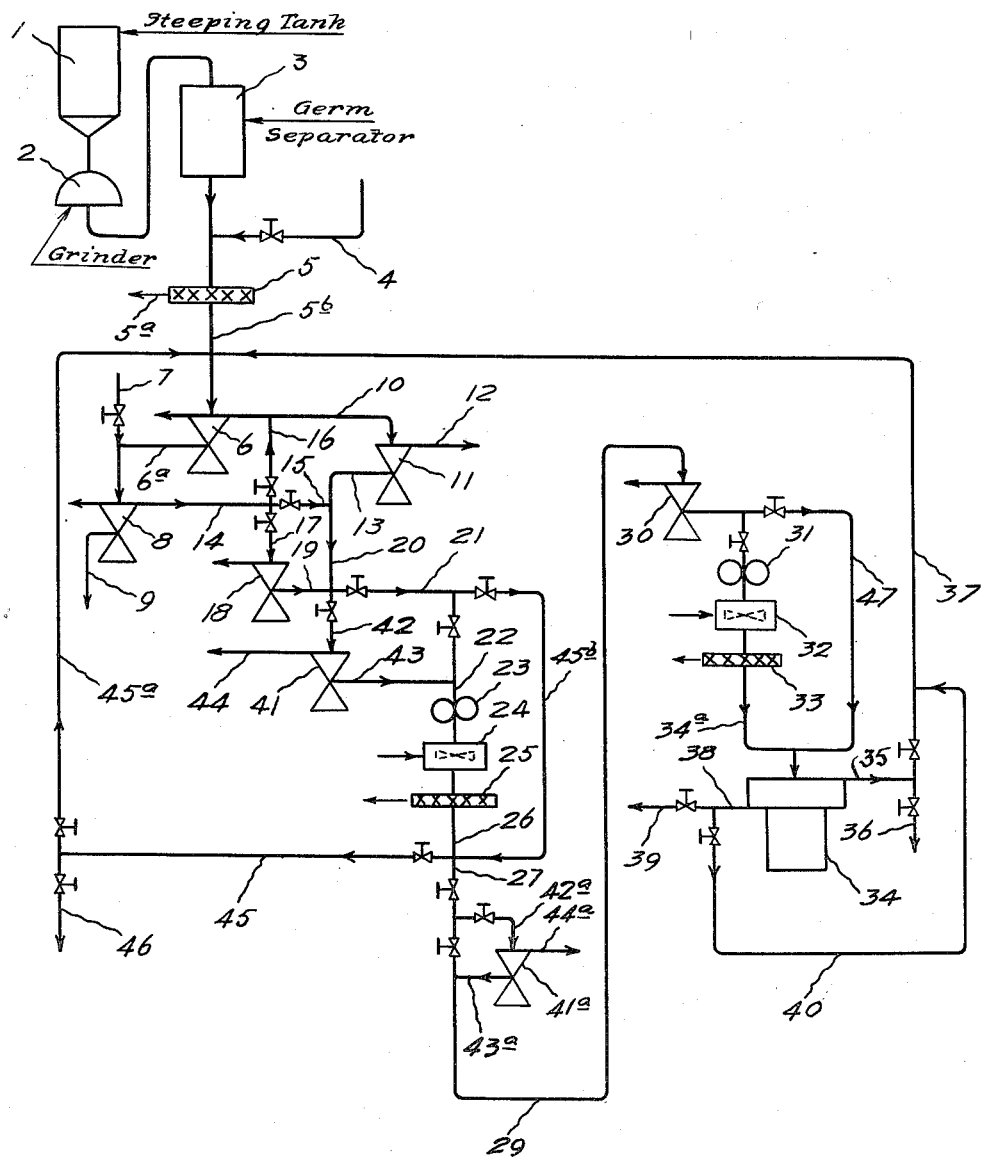
INVENTOR
CARL GORAN ECKERS
BY
Davis, Hoxie & Faithfull
ATTORNEYS Patented Feb. 27, 1951

2,543,660

UNITED STATES PATENT OFFICE 2,543,660

METHOD OF PRODUCING STARCH FROM STARCH MILK

Carl G. Eckers, Stockholm, Sweden, assignor to Aktiebolaget Separator, Stockholm, Sweden, a corporation of Sweden Application October 15, 1947, Serial No. 780,038
In Sweden October 16, 1946

5 Claims. (Cl. 127—69)

This invention relates to the treatment of starch milk to produce starch, and has for its object to provide an improved process for this purpose by which the starch may be produced efficiently in a concentrated form.

One of the steps in the production of starch is generally steeping the starch-containing raw material in a liquid, which usually contains sulphurous dioxide, for example. After the steeping, the material is subjected to a grinding or grating operation which, when the material contains germs as is the case with maize, is followed by a separation of the germs in order to remove the oil-bearing germs. The material remaining after these operations is then usually mixed with water and sifted or screened. In the sifting, fibres and albuminus substances are removed, and the liquid or starch milk leaving the sieves contains the major part of the starch and some fibres and albumens which then should be removed with a minimum loss of starch. To effect this removal, the starch milk is subjected to a first main separating treatment by means of settling vats, tables, centrifuges, continuous operation centrifugal separators, etc., so as to obtain a starch component containing the majority of the starch and also an impurity component containing most of the fibres and the albumens. However, part of the starch necessarily escapes with the impurity component. The starch component is preferably diluted with water, to which chemicals may be added, and is then subjected to a second main treatment by means of settling vats, tables, centrifuges, continuous operation separators, etc. As in the first main treatment, a starch component is thus obtained, which may be further treated in a suitable manner. The majority of the remaining solid impurities are removed in this second main treatment in the form of an impurity component containing not only fibres and albumens but also some starch.

The present invention relates more specifically to an improved process by which it becomes possible to recover the starch accompanying the impurity component both from the first and the second main treatment, it being possible according to the invention to treat these impurity components from both main treatments wholly or partly, individually or collectively. According to the invention, the impurity component from the first main treatment is first concentrated in a centrifugal separator, whereby some fibres and albuminous substances are removed. It is impossible, of course, to prevent some of the starch from accompanying the fibres and albuminous substances. However, a concentrate richer in starch is obtained, to which the impurity component from the second main treatment is preferably added, for the purpose of additional treatment. The last-mentioned impurity component may, before such additional treatment, be subjected to a similar concentrating, either in a separate centrifugal separator or in the same centrifugal separator as the impurity component from the first main treatment. Alternatively, the impurity component from the second main treatment may be reconducted, without concentration, to some previous locus of the system, either separately or mixed with the concentrated impurity component from the first main treatment. The concentrate thus obtained from the impurity components may then either be returned directly to some previous point in the process in advance of the second main treatment, or be subjected to additional concentrating by means of centrifugal separators, tables, etc. The latter concentrating should be carried out in such a manner that the majority of the impurities are removed and a concentrate still richer in starch is obtained, which is either returned in the described manner to a previous point in the process or withdrawn from the process and used for the production of a low grade product. The concentrate from the impurity components of the two main treatments may also, after the last-mentioned additional concentrating, be subjected to a mechanical and/or chemical treatment, followed by fine sifting, if desired, prior to returning or withdrawing it as described. It is possible, however, to carry out such additional concentrating after the mechanical and/or chemical treatment and the sifting.

Instead of reconducting or withdrawing the starch-enriched concentrate obtained from the impurity components of the two main treatments, it may be subjected to an additional concentrating in a continuously operating centrifugal separator, followed, if desired, by mechanical and/or chemical treatment and fine sifting, and finally separation in a centrifugal purifier. From the purifier, a rich starch component is thus discharged which is either returned to some previous point in advance of the second main treatment or withdrawn from the process. The component poor in starch obtained in the purifier is withdrawn from the process if the rich starch component is returned to the process, but if the latter component is withdrawn from the process, the component poor in starch may be returned to some point in advance of the second main treatment.

In the concentrating operations described above, a concentrate is obtained which can more readily be treated in nozzle type separators than when the sludge chiefly consists of starch. The sludge also becomes more plastic and its depositions in the separator bowls have more favorable angles of repose than if the concentrate consists chiefly of starch. It is thus possible to carry out a concentrating of the impurities in separator bowls having walls of lesser inclination towards the nozzles than those normally used for starch separation. In other words, it becomes possible to use separator bowls having a set of discs of large outer diameter relative to the diameter of the bowl, and to locate the nozzles nearer to the center of the bowl. The separator bowl is therefore better utilized, since a greater part of it, reckoned in percent, is occupied by the set of discs or the separating chamber.

For a better understanding of the invention, reference may be had to the accompanying drawing, in which the single figure is a flow diagram of a plant for practicing the invention.

In the drawing, the numeral 1 designates a steeping tank from which the material is conducted to a grinder 2 and thence to a germ separator 3 in which the oil germs are removed. The remainder, after addition of water through a pipe 4, is led to a sifter or strainer 5 in which fibres and albuminous substances are removed as shown at $5^a$. The remainder (starch milk) is then passed through pipe $5^b$ for the first main treatment in a separator 6 from which a starch concentrate is obtained, which is discharged into pipe $6^a$ where it is mixed with water from pipe 7 and then fed to a second separator 8. From separator 8, where the second main treatment is effected, a further purified starch product is discharged as underflow through pipe 9. The impurity component or overflow from the separator 6 is conducted through pipe 10 to a locus of centrifugal force in a concentrating separator 11, from which water and some fibres and albuminous substances or gluten escape through outlet 12 as overflow, while the starch concentrate is discharged as underflow through pipe 13. The impurity component is withdrawn from separator 8, for the second main treatment through pipe 14. This impurity component is either mixed with the concentrate from separator 11 through pipe 15, or led through pipes 16 and 10 to the inlet of the separator 11 or through pipe 17 to a locus of centrifugal force in a separate concentrating separator 18, from which the concentrate containing most of the starch is discharged through pipe 19 and then mixed with the concentrate discharged from the concentrating separator 11 through pipe 20.

The mixed concentrates are then conducted through pipes 21 and 22 to a grinding apparatus 23 in which it is subjected to mechanical treatment, a tank 24 in which it is subjected to chemical treatment, and a strainer or screen 25 in which it is sifted. The sifting as well as one of the operations 23, 24 may be omitted. The treated material is then led through pipes 26, 27, 28 and 29 to a continuously operating centrifugal separator 30 for additional concentrating and is then subjected to an additional mechanical and/or chemical treatment with subsequent sifting, in grinder 31, tank 32 and screen 33, from which it is fed through pipe $34^a$ to a purifier 34.

From the latter, a starch component is discharged through outlet 35 and is then either withdrawn from the process through pipe 36 or returned to a previous point of the process through pipe 37. As shown, the pipe 37 leads back to pipe $5^b$ in advance of the first main treatment at 6. The component poor in starch is discharged through the purifier outlet 38 and withdrawn from the process through pipe 39 or returned to some previous point of the system through pipes 40 and 37, the latter alternative being used in case the starch component is withdrawn from the process through pipe 36.

The two mixed impurity components from the two main treatments may, before the first-mentioned mechanical and/or chemical treatment and the sifting, be led to a separator, tables, etc. 41 by pipe 42 and then fed into the line 22 through pipe 43. Alternatively, the two mixed impurity components, after the first-mentioned mechanical and/or chemical treatment and the sifting, may be led to a separator, tables, etc. $41^a$ by pipe $42^a$ and then returned to the line 29 through pipe $43^a$. The apparatus 41, $41^a$ should be so regulated that the major part of the impurities in the supplied liquid are separated out and removed through pipes 44 and $44^a$, respectively. The concentrate from the separators 8 and 11 may, after the first mechanical and/or chemical treatment and subsequent sifting, be wholly or partly returned through pipes 45 and $45^a$ to some previous locus of the process in advance of the second main treatment, such as the pipe $5^b$, or withdrawn from the process through pipe 46. Such return or withdrawal may also be effected prior to the first mechanical and/or chemical treatment and subsequent sifting, by feeding the concentrate through the by-pass pipe $45^b$ directly into pipe 45. The second mechanical and/or chemical treatment and subsequent sifting may also be excluded by passing the concentrate from separator 30 through a by-pass pipe 47 to the purifier 34.

It will be understood that the mechanical operations 23 and 31 may be effected by conventional grinders used in installations for treating starch; and the sifting operations 25 and 33 may be effected by conventional screens used in such installations. The centrifugal purifier 34 may also be of conventional design.

In the prior art methods, the overflow or gluten component from the primary separation of the starch milk is subjected to a primary gluten separation to obtain a gluten overflow component which is practically free of starch and impurities. The underflow from this gluten separation necessarily contains some gluten in order to provide a gluten overflow of high purity, and some starch is entrained in the gluten in this underflow. Heretofore, this gluten and starch underflow 13 has been used in either one of two ways. The first alternative is to return it to the primary starch separator, which, however, does not result in freeing the starch from its entrainment in the gluten and therefore causes merely a recirculation of this starch back and forth through the system. The other alternative is to discharge this starch from the system, along with the gluten in which it is mainly enclosed in the protein. This starch, which may total 15 to 20 percent or more of the amount of gluten, is commonly used as cattle fodder.

By the present method, this starch is recovered from the gluten and is obtained in an improved state which, while perhaps not classified as high grade starch, is nevertheless useful for many purposes, such as paste-making. According to the invention, this starch is recovered by subjecting the gluten with its entrained starch to a centrifugal separating operation of a different character than those utilized for the previous separations, namely, to separation in the centrifugal purifier 34. Centrifuges of the purifier type are characterized by the fact that they provide a prolonged period of separation and have great ability for selective separation, as compared with the other types of centrifuges, and I have found that such purifiers are peculiarly suited for recovering the starch from the gluten obtained as previously described from the underflow from the gluten separator. Preferably, prior to the separation in the centrifugal purifier, the gluten is subjected to a series of grinding, screening and chemical treatments, as shown at 23, 24, 25, 31, 32 and 33, in order to release the starch from its entrainment in the gluten; but even with such treatments, the subsequent separation must be effected in the purifier type of centrifuge 34 because of the extreme fineness of the released starch. In this connection, the overflow from the separator 8 is advantageously combined with the gluten and starch underflow from the gluten separator 11, as such overflow contains extremely fine starch particles which can also be recovered by separation in the purifier 34.

The above-mentioned mechanical treatment refers to treating the material in mills, rasps, homogenizers, and other agitating machines, in which starch particles adhering to insoluble proteins and other impurities are liberated.

The chemical treatment consists in adding acids or lyes to the starch-containing liquid, whereby the pH of the liquid is altered so that a larger portion of the proteins than normally becomes soluble and therefore starch adhering to insoluble proteins and other impurities is liberated.

I claim:

1. In the treatment of maize starch milk containing fibers and gluten, in which the starch milk is subjected to a first separating operation to separate it into two components, one of which, the underflow, contains most of the starch, and the second of which, the overflow, contains fibers and gluten and some starch, and in which the starch underflow is diluted and subjected to a second separating operation to separate out an overflow containing some starch and most of the fibers and gluten, the improvement which comprises concentrating the overflow from the first separation in a locus of centrifugal separation to obtain a concentrate enriched in starch, at least some of which is entrained in gluten, combining said last concentrate with the overflow from said second separation, and feeding the resulting mixture to a centrifugal purifier and there subjecting it to an additional centrifugal separation which is relatively prolonged as compared with said centrifugal concentrating operation and which provides a greater selective separating ability than said operations, to recover the starch from the mixture.

2. The improvement according to claim 1, in which said mixture is subjected to grinding prior to said additional centrifugal separation.

3. The improvement according to claim 1, in which said mixture is subjected to screening prior to said additional centrifugal separation.

4. The improvement according to claim 1, in which said mixture is subjected to grinding and screening prior to said additional centrifugal separation.

5. The improvement according to claim 1, in which said mixture is subjected to grinding and screening, followed by centrifugal separation of a gluten overflow therefrom and further grinding and screening, prior to said additional centrifugal separation.

CARL G. ECKERS.

REFERENCES CITED

The following references are of record in the file of this patent:

UNITED STATES PATENTS

| Number | Name | Date |
|---|---|---|
| 406,559 | Behr | July 9, 1889 |
| 717,700 | Murdoch | Jan. 6, 1903 |
| 1,794,105 | David | Feb. 24, 1931 |
| 1,923,455 | Peltzer | Aug. 22, 1933 |
| 2,013,668 | Peltzer | Sept. 10, 1935 |
| 2,310,651 | Peltzer | Feb. 9, 1943 |
| 2,323,077 | Peltzer | June 29, 1943 |
| 2,418,621 | Callaghan | Apr. 8, 1947 |
| 2,437,036 | Maurer | Mar. 2, 1948 |